R. J. MALLOY AND W. F. BEATTY.
MUSICAL TOY.
APPLICATION FILED SEPT. 20, 1921.
1,437,604.
Patented Dec. 5, 1922.
2 SHEETS—SHEET 1.
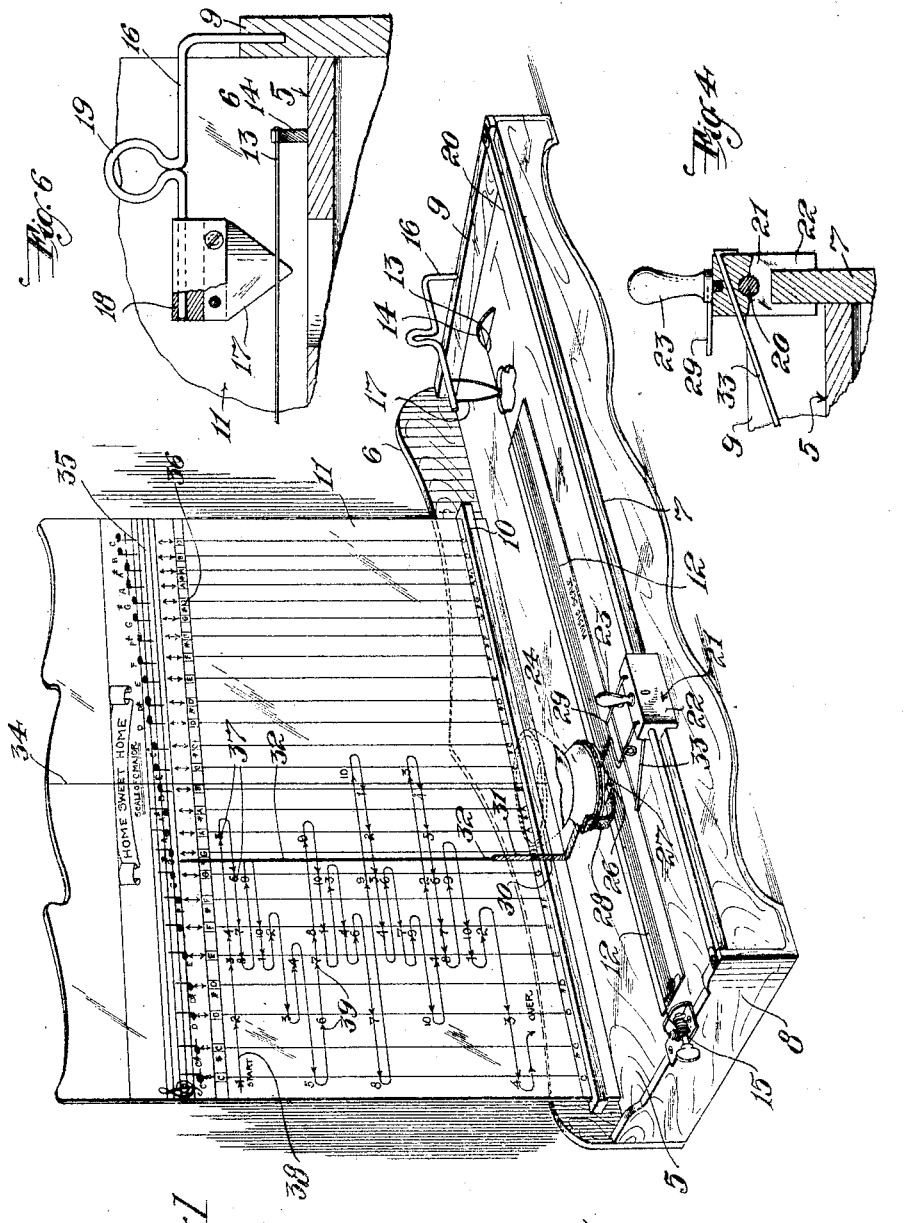
INVENTORS
R. J. Malloy and
BY W. F. Beatty
C. P. Goepel
ATTORNEY

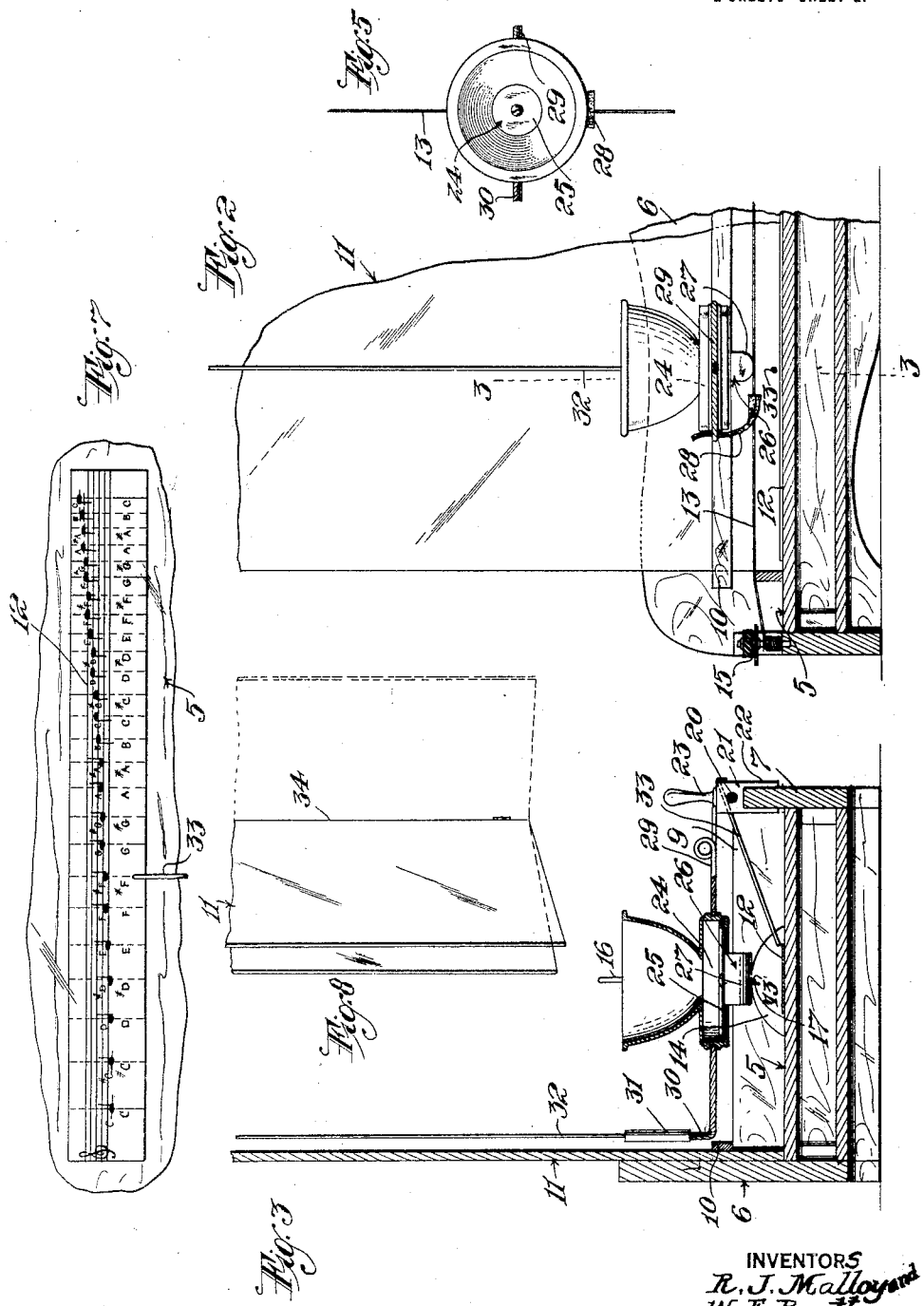

Patented Dec. 5, 1922.

1,437,604

UNITED STATES PATENT OFFICE.

RICHARD J. MALLOY, OF LONG ISLAND CITY, AND WILLIAM F. BEATTY. OF LAUREL HILL, NEW YORK.

MUSICAL TOY.

Application filed September 20, 1921. Serial No. 501,948.

*To all whom it may concern:*

Be it known that we, RICHARD J. MALLOY, a citizen of the United States, and resident of Long Island City, in the county of Queens, State of New York, and WILLIAM F. BEATTY, a citizen of the United States, and resident of Laurel Hill, in the county of Queens and State of New York, have invented certain new and useful Improvements in Musical Toys, of which the following is a specification.

This invention relates to an improved musical toy and has for its primary object to provide a device whereby the musical notes or symbols of any piece of written music may be properly sounded in succession by a child or other person having little or no musical education. It is another object of our invention to provide a device for the above purpose in which all the notes are sounded through the medium of a single properly tensioned metal string.

In one embodiment of the invention, we provide a base having the musical scale bearing the notes or symbols upon the upper surface of said base and a single tensioned string extending longitudinally over the scale. For use in connection with the base we provide a chart having numerals, notes or other characters or symbols printed thereon and connected by a continuous line. A sound box is mounted upon the base and provided with an amplifying diaphragm having a metal member connected thereto and engaged upon the string. An indicating rod is connected to the sound box, said rod being positioned in accordance with the symbols or characters on the chart as the sound box is shifted longitudinally of the string. A pick is mounted upon the base at one end thereof and is adapted to be engaged with one end of the string as the indicating rod is brought into registration with the characters on the chart. In a short while proficiency may be attained in the operation of the device so that the notes may be clearly sounded in succession upon the string and thereby produce the musical melody. If the user is capable of reading a musical composition, any piece of music may be substituted for the chart above referred to and the sound box moved upon the string in accordance with the guide scale provided upon the surface of the base directly under the string. By means of such a device, children may derive considerable pleasure and amusement and the invention also affords instruction so that by continued use the child will become familiar with the various notes of the musical scale and their relative positions thereon.

It is also an object of our invention to provide a musical toy of the above character, the several parts of which are of very simple form, so that the device may be manufactured and sold at comparatively small cost and wherein the several parts when not in use, can be very compactly arranged.

With the above and other objects in view, the invention consists in the improved musical toy and in the form, construction and arrangement of its several parts as will be hereinafter more fully described, illustrated in the accompanying drawings and subsequently incorporated in the subjoined claims.

In the drawings wherein we have illustrated one simple and practical embodiment of the invention and in which similar reference characters designate corresponding parts throughout the several views, Figure 1 is a perspective view showing the toy arranged in position for use, Figure 2 is an enlarged fragmentary longitudinal section, Figure 3 is a transverse section taken on the line 3—3 of Figure 2, Figure 4 is a detail vertical section showing the means for mounting the shiftable sound box on the base, Figure 5 is a top plan view of the sound box, Figure 6 is a fragmentary vertical section showing the mounting and construction of one form of pick, Figure 7 is a detail plan view showing the guide scale secured upon the base, Figure 8 is a fragmentary perspective view of the foldable chart, and Figure 9 is a detail section showing one means for detachably connecting the indicating rod to the sound box.

Referring in detail to the drawings, which it will be understood are merely illustrative of one possible embodiment of the present invention, there is shown a suitably constructed base 5. As herein disclosed, this base has a rear upstanding wall 6, a front marginal wall 7 and end walls 8 and 9 respectively. To the front side of the rear wall 6 a bar 10 is secured at its ends, said bar extending longitudinally in spaced parallel relation to said wall. Between the bar 10 and the rear wall 6 of the base, the lower edge of a chart 11 is adapted to be removably engaged. The construction and purpose of this chart will be hereinafter more fully referred to.

A music scale 12 having the conventional notes or symbols depicted thereon extends longitudinally upon the upper surface of the base 5. A single string 13, preferably though not necessarily, of metal, extends longitudinally of the base over the scale 12. One end of this string is fixed, as at 14, to the base 5 while the other end thereof is connected to a suitable adjusting means 15, mounted upon the end wall 8 of the base whereby the tension of said string may be properly adjusted.

In a socket provided in the end wall 9 of the base, one end of a rod 16 is adapted to be removably engaged. This rod has a horizontal portion extending over the base and at its other end is provided with a pick 17 extending downwardly from said rod and having its lower end adapted for engagement with the string 13. This pick 17 may be in the form of a wire loop, the ends of which are fixed to the rod 16, or as shown in Figure 6 of the drawings, the pick may consist of a suitably shaped piece of celluloid or other material detachably held in a head 18 which is permanently fixed to the end of the rod 16. This rod intermediate of its ends has an upstanding loop 19 formed therein which affords a convenient finger piece whereby the pick may be manipulated.

A rod 20 has its ends fixed to the end walls 8 and 9 and extends longitudinally above and in spaced parallel relation to the front marginal wall 7 of said base. Upon this rod a slide block 21 is loosely engaged, said block having a bifurcated lower portion 22 supporting the base wall 7 so as to prevent the turning or pivotal movement of said block upon the rod 20. This block is provided with a suitable handle 23 whereby it may be readily shifted longitudinally along the rod.

The sound box 24 may be of any desired size and form and is provided with a diaphragm 25 to the underside of which at its center, a metal block 26 is fixed. This block is preferably of cold rolled steel and has a convex or rounded surface 27 for engagement upon the music string 13 to determine the note of the string. A piece of felt or other material, indicated at 28, is suitably fixed to one side of the sound box and bears at its lower end on the string 13 so as to deaden all of that portion of the string upon the left hand side of the sound box. The sound box is connected to the slide block 21 by means of a yieldable wire yoke 29, the ends of which are fixed in the upper side of said block. This wire connection has a portion extending around the sound box and rearwardly therefrom and terminates in an upward extension 30 to which a sleeve 31 is fixed. In this sleeve one end of an indicating rod 32 is detachably engaged. The slide block 21 is further provided with an inwardly and downwardly inclined rod or pointer 33 which is moved with relation to the scale 12 when the said block is shifted along the rod 20.

The chart 11 is suitably constructed in two sections connected along the vertical hinge line 34 by means of a strip of linen or any other flexible material secured to the abutting edges of said sections. When the chart is in use as shown in Figure 1, the lower edges of the two sections are engaged between the bar 10 and the wall 6 of the base and are, therefore, held against folding movement.

Upon the surface of the chart at the upper portion thereof, the music scale 35 corresponding to the scale 12 on the base is printed. The proper letter or character may be printed beside each of the notes on this scale, or these characters may be printed on the chart below the respective notes as indicated at 36. The notes of the particular musical composition shown on the illustrated chart are represented by numerals from 1 to 10 repeatedly printed on the chart as shown at 37, these numerals being connected in the order of succession by means of a line 38, said line having arrows therein at intervals as shown at 39. Of course, if desired, in lieu of the numerals, letters or other characters might be provided or the note symbols themselves printed on the chart and connected by the line 38.

In the use of the device as above described, the sound box 24 is moved along the wire 13 to position the indicating rod 32 opposite the numeral 1 at the upper end of the line 38. The pick 17 is swung in the arc of a circle and as the lower end of the pick strikes the wire 13, the tone corresponding to note "C" will be sounded. The sound box is then quickly shifted until the rod 32 is opposite to the numeral 2 and the next note "D" is sounded. This shifting of the sound box along the string 13 is continued in the order of the numerals appearing on the chart, following the direction of the arrows 39. After practising for a short while, the playing of any musical composition can be rapidly performed. A number of the musical charts having different musical compositions thereon may be provided with the device. One who has acquired a musical education and has ability to read the notes, can substitute any piece of music for the chart and properly position the sound box in accordance with the notes of the music by following the guide scale 12.

From the foregoing description considered in connection with the accompanying drawings, the construction, manner of operation and several advantages of the invention will be readily understood. The device will afford considerable pleasure and amusement to children and likewise, is instructive since the child will become familiar with the notes of the musical scale so that he will soon be able to read any simple musical composition without using the guide chart. As herein described the several parts of the device are of relatively simple form and construction so that the toy can be manufactured and sold at relatively small cost. When not in use the chart 11 may be readily removed from its position between the bar 10 and the base wall 6 and the two parts thereof folded upon each other as seen in Figure 8. The chart thus folded may be laid upon the base 5 and the pick 17 and indicating rod 32 also removed and arranged upon the base. In this condition the device can be stored away in a relatively small space.

While we have herein shown and described one practical and desirable embodiment of the invention, it will nevertheless be understood that our improved toy may also be produced in various other alternative forms and we accordingly reserve the privilege of resorting to all such legitimate changes in the form, proportion and arrangement of the several parts as may be fairly embodied within the spirit and scope of the invention as claimed.

We claim:

1. A musical device of the character described comprising a base having a musical scale thereon, a string mounted upon the base and extending over said scale, a pick for said string mounted on the base, and a sound box shiftable longitudinally over said scale and having a part engaged with said string.

2. A musical device of the character described comprising a base having a musical scale thereon, a string mounted upon the base and extending over said scale, a pick for said string mounted on the base, a sound box shiftable longitudinally over said scale and having a part engaged with said string, and means fixed to the sound box and bearing upon said string to deaden the sound vibrations of the string at one side of the sound box.

3. A device of the character described comprising a base, a string extending longitudinally over the base and fixed thereto, a pick for said string pivotally mounted on the base, a sound box longitudinally movable upon the base and having a part engaging said string, in combination with a chart provided with spaced characters arranged in sequential relation thereon corresponding to the notes of the musical composition, and an index member movable with the sound box and adapted to be positioned in registering relation with the characters on the chart to thereby determine the position of the sound box upon the string whereby musical tones may be produced corresponding to the notes of the musical composition.

4. A musical device of the character described comprising a base having a musical scale thereon, a string mounted upon the base and extending longitudinally over said scale, a pick for said string mounted on the base, a sound box having a diaphragm and a part fixed thereto bearing on said string, means for mounting the sound box upon said base for longitudinal shifting movement, means carried by the sound box and engaging said string to deaden the sound vibrations at one side of the sound box, in combination with means on the base for supporting a musical composition in an upright position whereby the sound box may be shifted to position the same with relation to the notes of said scale in correspondence to the successive notes of the musical composition.

5. A musical device of the character described, comprising a base, a sound producing string mounted upon the base and adapted to be engaged by a pick, and a sound box mounted for movement longitudinally of the string and having a part engaged with said string.

In testimony that we claim the foregoing as our invention, we have signed our names hereunder.

RICHARD J. MALLOY.
WILLIAM F. BEATTY.